(12) United States Patent
Bingham

(10) Patent No.: US 8,504,536 B2
(45) Date of Patent: Aug. 6, 2013

(54) NORMALIZING METADATA BETWEEN LIBRARY CONTENT PROVIDERS

(75) Inventor: Talin Ryan Bingham, Wanship, UT (US)

(73) Assignee: Sirsi Corporation, Provo, UT (US)

( * ) Notice: Subject to any disclaimer, the term of this patent is extended or adjusted under 35 U.S.C. 154(b) by 0 days.

(21) Appl. No.: 13/249,867

(22) Filed: Sep. 30, 2011

(65) Prior Publication Data

US 2013/0086014 A1 Apr. 4, 2013

(51) Int. Cl.
*G06F 17/30* (2006.01)
(52) U.S. Cl.
USPC .......................................................... 707/695
(58) Field of Classification Search
USPC ......................................................... 707/695
See application file for complete search history.

(56) References Cited

U.S. PATENT DOCUMENTS

| 8,095,949 | B1* | 1/2012 | Hendricks et al. | 725/29 |
|---|---|---|---|---|
| 2002/0082939 | A1* | 6/2002 | Clark et al. | 705/26 |
| 2005/0166143 | A1* | 7/2005 | Howell | 715/523 |
| 2005/0203976 | A1* | 9/2005 | Hyun et al. | 707/204 |
| 2010/0262515 | A1* | 10/2010 | Brewer | 705/27 |
| 2011/0208614 | A1* | 8/2011 | Tom | 705/27.1 |
| 2011/0276863 | A1* | 11/2011 | Bhise et al. | 715/201 |
| 2012/0173353 | A1* | 7/2012 | Rausch et al. | 705/26.1 |
| 2013/0006999 | A1* | 1/2013 | Wojtowicz | 707/741 |

* cited by examiner

*Primary Examiner* — Apu Mofiz
*Assistant Examiner* — Dara J Glasser
(74) *Attorney, Agent, or Firm* — Workman Nydegger

(57) ABSTRACT

Providing electronic library resources. A method includes obtaining metadata about one or more electronic library resources from a library resource publisher. The metadata defines locations of the library resources. The metadata is normalized to a standardized format appropriate for a plurality of library resource systems.

20 Claims, 2 Drawing Sheets

NORMALIZING METADATA BETWEEN LIBRARY CONTENT PROVIDERS

BACKGROUND

Background and Relevant Art

Libraries have evolved slowly over time until recent times. Typically a library housed a collection of books and the quality of the library was determined by the number of volumes that the library housed and the diversity of works maintained by the library. Libraries could increase their reputation by entering into agreements with other libraries to share works through inter-library loans.

In recent history, digital (or electronic) works have been created at an astounding rate. Such digital works may include original works created by authors and distributed digitally alone or along with printed versions; automatically generated digital works aggregating content from other digital works; digital works created from works formerly available only in printed form, such as by scanning, optical character recognition, transcribing, etc.; digital audio or video recordings; etc. The growth of the body of available digital works has been exponential in nature. To stay relevant, libraries have had to adapt to be able to provide digital works as well as physical works to patrons.

Digital works can be distributed in a number of different fashions. For example, digital works may be distributed via a physical storage medium such as a CD or DVD. Alternatively, digital works may be delivered electronically as a digital download via a communication medium such as a network.

As with physical works, digital works are typically protected by intellectual property rights that allow authors and publishers to collect royalties for use of the works. With physical books, collecting royalties and determining that a work is authorized is quite simple. Physical possession of the book by a library typically indicates purchase of the book where at least a portion of the purchase price is paid as a royalty to an author and/or publisher. Unauthorized copies of physical works are often degraded in quality as exact copies are difficult if not impossible to make. For digital works it can be more complicated to collect royalties and to know that appropriate royalties have been paid. It is often trivial to create an exact copy of a digital work, and possession of a high-quality copy is not dispositive as to whether or not the appropriate royalties have likely been paid.

Digital works are distributed by digital content publishers. Each digital content publisher has their own interface and requirements for being able to obtain digital works from that publisher. Additionally, publishers may have their own content protection schemes to prevent unauthorized access or copying of digital works.

As noted, libraries are able to provide digital content as well as physical content. The libraries will often obtain digital content from digital content publishers on an ad hoc basis. When a patron wants to access a digital work, the library may have an interface that allows the patron to access a content publisher's database. However, the patron will typically need to interact with the content publisher and because of the various content publishers, a single patron interacting with multiple content publishers at a single library will have multiple user experiences.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a digital library environment. The method includes acts for providing electronic library resources. The method includes obtaining metadata about one or more electronic library resources from a library resource publisher. The metadata defines locations of the library resources. The metadata is normalized to a standardized format appropriate for a plurality of library resource systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement a system whereby a centralized electronic resource system is capable of interacting with a plurality of different digital content publishers. The centralized electronic resource system can provide a consistent interface for library patrons irrespective of the publisher from which a digital work is obtained. The centralized electronic resource system is capable of storing information about publishers of digital works, information about digital works available from the publishers, information about customers who want to access the publishers' databases to obtain the digital works, information about authorization and authentication, information about format and content types, and digital rights management for publishers and customers.

Figure 1:
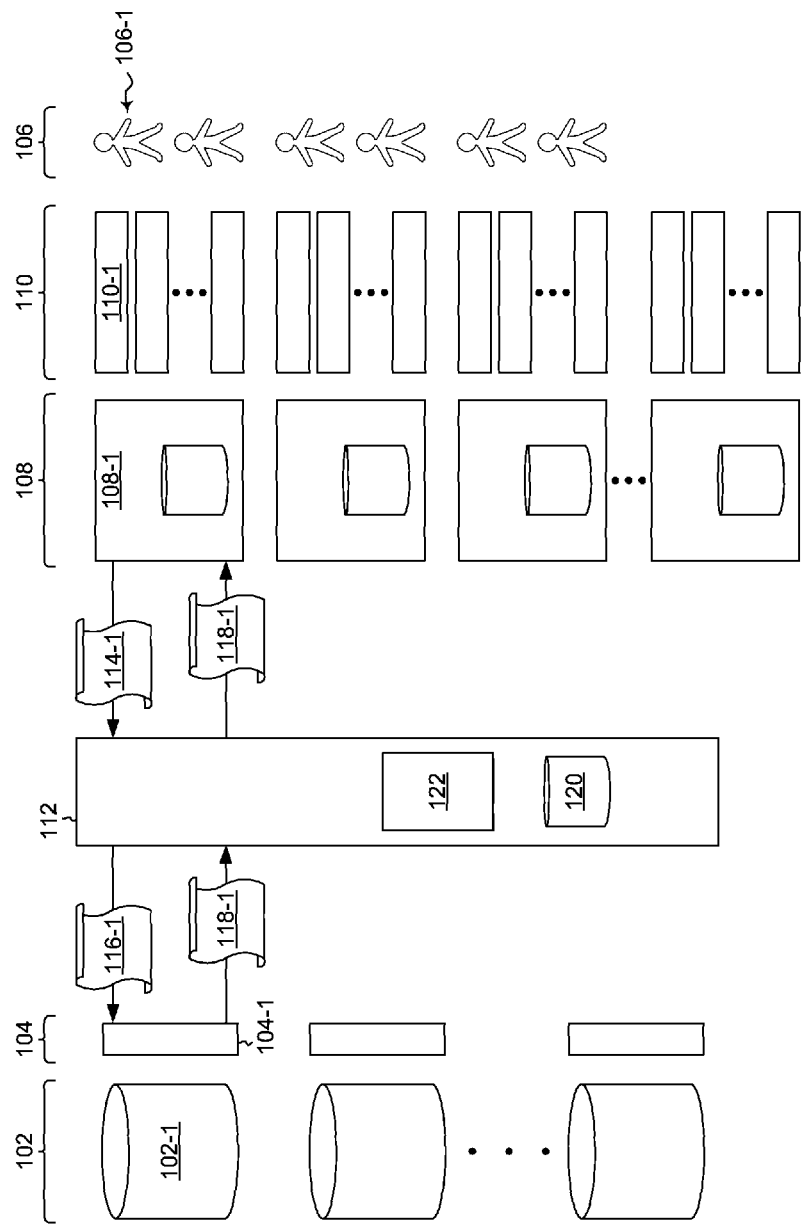
FIG. 1 illustrates an environment that allows electronic resources to be delivered from a library.

Referring now to FIG. 1, an example is illustrated. FIG. 1 illustrates a set of digital content publishers 102. The digital content publishers 102 provide digital works to consumers of the digital works.

Each of the content publishers provides content using a specific format. In the example shown in FIG. 1, a set of specific publisher interfaces 104 are shown. Each interface for each publisher may be slightly or drastically different from an interface for a different publisher. In addition to the specific publisher interfaces, a publisher may use Machine Readable Catalogue (MARC) interfaces/messages to determine what content is at a particular publisher. MARC messages may provide bibliographic information and related information about works. For example, a MARC message may provide information that may include, for example, title, author, publisher, copyright date, etc.

FIG. 1 illustrates a set of patrons (sometimes referred to herein as users) 106. Patrons are, in some embodiments, the end use consumers of digital and physical content. The patrons may obtain the resources from the publishers 102. Patrons 106 may obtain content from the publishers 102 either directly from the publishers 102 or through an intermediary. If content is obtained directly from the publishers 102, then a patron will likely use a different user interface 104 for each different publisher from which a patron obtains content. For example, each publisher in the set of publishers 102 may have different ways of specifying resources to accessed, different authentication protocols for authorizing a user to access a resource, etc.

Even using certain intermediary models, a patron may still need to use a different user interface for obtaining a resource from a different publisher. For example, FIG. 1 further illustrates a set of integrated library systems (ILSs) 108. Each ILS is associated with one or more interfaces as illustrated by the set of ILS user interfaces 110. Each of the ILS user interfaces in the set of ILS user interfaces determines how a patron will interact with an ILS in the set of ILSs 108. The ILS interfaces may be user interfaces available for different purposes or different user environments. For example, some interfaces in the set of interfaces 110 may be designed for use with a web browser. Other interfaces in the set of interfaces 110 may be designed for use with a stand-alone application such as an "app" on a mobile device or a widget. Still other interfaces in the set of interfaces 110 may be designed for use as portals in an enterprise environment. While a user may be able to consistently use one or more of the interfaces in the set of ILS interfaces 110, a given ILS may direct a patron directly to a publisher in the set of publishers 102 to obtain a given resource. This causes the patron to access a user interface provided by the publisher, which as noted above may vary from one publisher to the next.

However, embodiments may use an intermediary proxy between patrons and publishers which allows patrons to use a consistent interface regardless of the publisher. FIG. 1 further illustrates a centralized electronic resource system 112. The centralized electronic resource system 112 includes the ability to communicate using any one of the interfaces 104. In this way, the centralized electronic resource system 112 can access the publishers 102 and store content from the publishers 102. The centralized electronic resource system 112 can also pass credential information from the patrons 106 thru to the publishers 102. The centralized electronic resource system 112 can present appropriate credentials to the publishers 102 as if the centralized electronic resource system 112 were the patrons 106. The centralized electronic resource system 112 can then pass the resources on to the patrons 106. All of this can be done in a consistent manner which allows patrons to have a consistent user interface to obtain resources irrespective of what publisher is eventually used to obtain resources.

Illustrating now a specific example, a patron 106-1 may send a request 114-1 for an electronic resource 118-1 using an interface 110-1 of an ILS 108-1. The request 114-1 is intercepted by the centralized electronic resource system 112. In some embodiments, the request 114-1 may be in a standard form appropriate for the centralized electronic resource system 112, but that can be sent without respect to the eventual source of an electronic resource (i.e., a publisher). The centralized electronic resource system 112 converts the request 114-1 to a request 116-1 in format and a protocol appropriate for the specific publisher 102.

In some embodiments as outlined below, the centralized electronic resource system 112 is able to convert a request 114-1 to the request 116-1 in an appropriate format and protocol based on normalized metadata. In particular, the centralized electronic resource system 112 may receive metadata from a publisher. The metadata may include specific information about how the publisher can be accessed. This metadata can be normalized such that a request 114-1 can be consistent no matter from what eventual publisher an electronic resource 118-1 is obtained.

In some embodiments, the centralized electronic resource system 112 may act as a proxy for the patron 106-1 or the ILS 108-1. For example, the centralized electronic resource system 112 may receive authentication credentials (e.g., username and password) from the patron 106-1. The centralized electronic resource system 112 may then present these credentials to the publisher 102-1 as if the centralized electronic resource system 112 were the patron 106-1. The publisher 102-1 will then interact with the centralized electronic resource system 112 as if it were the patron 106-1.

The publisher 102-1 returns a resource 118-1 based on the request 116-1. The resource 118-1 can then be sent to the ILS 108-1 and finally to the patron 106-1.

The resource 118-1 can be delivered to the patron 106-1 in one or more of a number of different formats depending on technology at the disposal of the patron 106-1. In particular, the patron may have one or more of a personal computer, an e-book reader, a tablet device, a cell-phone, a handheld electronic device, or other device. The publisher 102-1 may provide the resource 118-1 in a format appropriate for the device (s) available to the patron 106-1. In some embodiments, a patron may be able to register with the centralized electronic resource system 112 what devices the patron 106-1 has. The centralized electronic resource system 112 can then automatically, or at the request of the patron 106-1, obtain a particular format of the resource 118-1 appropriate for the patron 106-1. Alternatively, the patron may be prompted to select an available format from a list of formats provided by the publisher for the specific resource.

In some embodiments, the publisher 102-1 may provide the resource 118-1 in a format based on interaction with the centralized electronic resource system 112. For example, the centralized electronic resource system 112 may request a format that the centralized electronic resource system 112 knows is supported by devices in possession of the patron 106-1. For example, the publisher 102-1 may include protocol features that allow the centralized electronic resource system 112 to specify a particular format. The centralized electronic resource system 112 can use these protocol features to request a particular format of the resource 118-1.

Alternatively, the centralized electronic resource system 112 may act as a proxy for a particular device in possession of the patron 106-1, and receive formats based on what type of device the publisher 102 thinks that it is interacting with irrespective of the actual type of device the publisher 102 is interacting with. In this example, the publisher 102 provides resources in a format based on the type of device with which the publisher 102 believes it is interacting. Thus for example, the publisher may believe that it is interacting with an e-book, and therefore provide a format appropriate for an e-book. Illustratively, the centralized electronic resource system 112 may spoof a user agent appropriate for a particular device in possessions of the patron 106-1. For example, nearly all web browsers specify a user agent when making HTTP requests. The user agent may identify an operating system, browser client and other information. Thus, even though the centralized electronic resource system 112 is not necessarily running a particular operating system, such as a mobile device operating system, the centralized electronic resource system 112 can spoof a user agent that causes the publisher 102-1 to believe that the centralized electronic resource system 112 is running the spoofed operating system. This may cause the publisher 102-1 to deliver the resource 118-1 in a format appropriate for the spoofed user agent to the centralized electronic resource system 112. The resource 118-1 can then be delivered to the ILS 108-1 and/or the patron 106-1 in a format appropriate for the patron 106-1.

In some embodiments, the electronic resource 118-1 is returned thru the centralized electronic resource system 112 immediately upon request or very shortly thereafter. However, in other embodiments, the actual electronic resource 118-1 may not be delivered to a patron's device until later. For example, the electronic resource may not be delivered until the patron 106 opens up the appropriate e-book reader or other reader application. For example, in some embodiments, the patron 106 makes the request and the electronic content is effectively "checked out" to the patron 106, but the electronic resource 118-1 itself stays at the publishers database 102-1 until the patron 106 opens their e-book reader or other appropriate software application and does a synchronization process.

The centralized electronic resource system 112 may include functionality for obtaining a plurality of different formats of the electronic resource 118-1 for the patron 106-1. For example, the patron 106-1 may have access to a number of different devices capable of rendering electronic resources. For example, the patron 106-1 may have a smart phone, an e-book reader, a tablet device, a laptop, etc. The centralized electronic resource system 112 can download different formats of the same electronic resource 118-1, one suitable for each device. In particular, each device may have different formatting and/or digital rights management (DRM) schemes. The centralized electronic resource system 112 can obtain, e.g. by direct request or acting as a proxy, different formats of the same electronic resource 118-1 with appropriate formatting and/or DRM protocols.

Embodiments may be implemented where the centralized electronic resource system 112 can maintain progress book marking throughout different versions or formats of the same electronic resource 118-1. For example, the patron 106-1 may begin consuming the electronic resource 118-1 using an e-book reader. When the patron 106-1 has completed a consuming session, the bookmark may be created indicating the location in the electronics resource 118-1 to where the patron 106-1 has read. The patron 106-1 may then access the electronic resource 118-1 using a smart phone. The centralized electronic resource system 112 may have already updated a bookmark in the smart phone version of the electronic resource 118-1 to correspond to the bookmark created in the e-book version of the electronic resource 118-1 when the patron completed the consuming session. Thus, when the patron accesses the electronic resource 118-1 using the smart phone, the patron 106-1 can easily and quickly move to a location in the smart phone version of the electronic resource 118-1 corresponding to the bookmark in the e-book reader version of electronic resource 118-1.

Cross platform book marking may be performed or accomplished in a number of different ways. In one embodiment, the centralized electronic resource system 112 may maintain a database 120. The database 120 may store the various versions of the electronic resource is 118-1 and correlate corresponding portions of the different versions with each other such that consistent book marking may be accomplished. The device used by the patron 106-1 may report to the centralized electronic resource system 112 a particular bookmark location. Subsequently, regardless of which device the patron 106-1 uses next to access the electronic resource 118-1, the correlation between different versions of the same electronic resource 118-1 can be used to identify bookmark locations such that the patron 106-1 can continue consuming the electronic resource 118-1 from a bookmark location. In particular, centralized resource electronic resource system 112 can maintain bookmark locations and provide correlating functionality.

Alternatively, embodiments may allow for the use of remote shared drop box that is hosted by other entities. The device used by the patron 106-1 can connect to the drop box and identify the bookmark location for a given device. The drop box can then identify the bookmark location to the centralized electronic resource system 112 which can then provide corresponding bookmark locations in other versions of electronic resource 118-1 to the drop box or directly to the patron 106-1 such that the patron can continue consuming the electronic resource 118-1 from a bookmark location regardless of the device used to consume the electronic resource 118-1. In some embodiment, the shared drop box location can provide a single storage location of the electronic resource (such as an e book) which would allow any device to use that single electronic resource instance and thereby share the bookmark amongst the various devices.

In some embodiments, the centralized electronic resource system 112 may be able to communicate with the publisher 102-1 through an interface 104 appropriate for the publisher 102-1. For example, in some embodiments, the electronic resource system may communicate using a vendor specific (i.e. publisher specific) and likely proprietary web service software interface 104 that is used to get runtime information.

In some embodiments, the publisher 102-1 may provide metadata about resources rather than the complete resources. For example, the centralized electronic resource system 112 may request information from the publisher 102-1 about what resources are available at the publisher 102-1. The publisher 102-1 can then return information about the resources. Such information may include, for example, title, author, publisher, copyright date, etc. In some embodiments, this can be done using MARC messages/interfaces or the publisher specific interfaces 104. Various different embodiments may be implemented. For example, in some embodiments, individual records may be sent for different resources available at the publisher 102-1. Alternatively, a catalog may be sent including a number of different records for different resources available from the publisher 102-1.

Some embodiments may implement a super catalog 122. The super catalog 122 can be stored at the centralized electronic resource system 112. The super catalog 122 can include information about resources from one or more of the publishers 102. The super catalog 122 can allow patrons and/or ILSs to search the centralized electronic resource system 112 for resources that can be obtained using the centralized electronic resource system 112. In this way, once data has been obtained by centralized electronic resource system 112, queries can be run against the super catalog 122 to determine what resources are available rather than running queries against individual publishers on an ad hoc basis.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
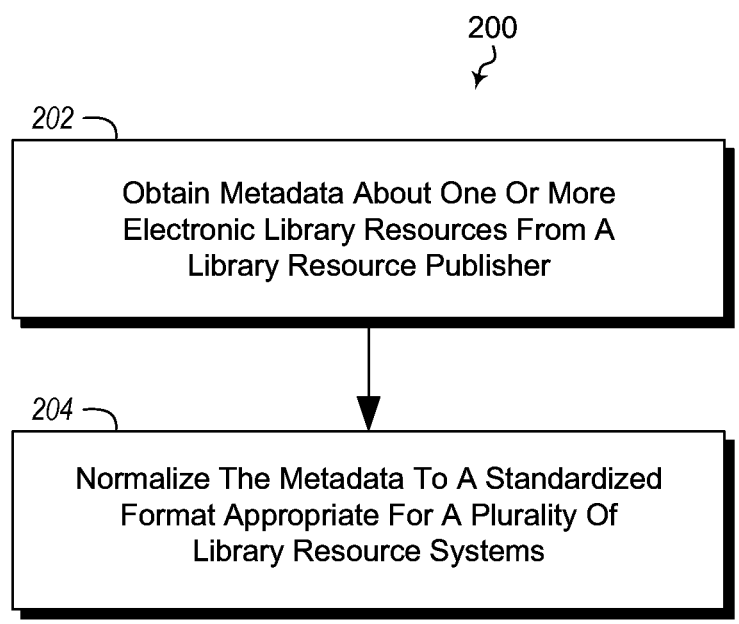
FIG. 2 illustrates a method of providing library resources.

Referring now to FIG. 2, a method 200 is illustrated. The method 200 may be practiced in a computing environment, including in a digital library environment. The method 200 includes acts for providing electronic library resources. The method includes obtaining metadata about one or more electronic library resources from a library resource publisher (act 202). The metadata may define locations of the library resources. For example, as illustrated in FIG. 1, the centralized electronic resource system 112 may obtain metadata from the publishers 102 about electronic resources available from the publishers 102.

The method 200 further includes normalizing the metadata to a standardized format appropriate for a plurality of library resource systems. In particular, in the example, shown in FIG. 1, the metadata can be handled by the centralized electronic resource system 112 such that queries can be made by ILSs or patrons against the centralized electronic resource system 112 irrespective of the metadata formats from the publishers 102.

The method 200 may further include creating a super catalog based on the normalized metadata. For example, as illustrated in FIG. 1, a super catalog 122 is created based on metadata received from the different publishers in the set of publishers 102. In some embodiments, resource systems, such as ILSs 108, request resources against the super catalog. Alternatively or additionally, embodiments may publish the normalized metadata to the library resource systems. For example, normalized metadata could be published to the ILSs 108, rather than publishing metadata from the publishers 102 directly to the ILSs 108.

Embodiments may further include receiving from one or more resource systems, one or more requests for library resources. The requests are based on the normalized metadata. For example, ILSs 108 may send requests, such as request 114-1, to the centralized electronic resource system 112 based on normalized metadata provided by the centralized electronic resource system 112.

The method 200 may further include retrieving the resource from the publisher and providing the resource to a patron exclusive of the publisher providing the resource directly to the patron. In particular, rather than a patron being redirected to a publisher website, embodiments may include functionality for allowing the centralized electronic resource system 112 to obtain resources from the publishers 102 and to provide them to the patrons 106 without the patrons 106 needing to access publisher user interfaces. In some such embodiments, retrieving may include retrieving in a plurality of versions. For example, each of the versions may include their own use restriction requirements. For example, one version may have use restrictions appropriate for use with an e-book reader. Another version may have use restrictions appropriate for use with cellular phone reader software. Another version may have use restrictions appropriate for use with desktop computer software.

Some embodiments may store the plurality of versions and associate the plurality of versions with a particular customer. For example, in the example illustrated in FIG. 1, embodiments may store the versions in the database 120 of the centralized electronic resource system 112, where the stored versions may be associated with a particular ILS in the ILSs 108. The stored versions can then be delivered to the associated ILS when requested.

Some embodiments may store the plurality of versions and associate the plurality of versions with a particular patron. For example, in the example illustrated in FIG. 1, embodiments may store the versions in the database 120 of the centralized electronic resource system 112, where the stored versions may be associated with a particular patron in the patrons 106. The stored versions can then be delivered to the associated patron when requested.

Embodiments may be implemented which further include storing a bookmark for each of the versions specifying a location within the resource. For example, a bookmark, as described above may be implemented. The bookmark could be correlated across different versions such that irrespective of which version was being used by a patron, the bookmark would allow a patron to access a common bookmarked location in any one of the versions. In some embodiments, as described above, the location in the resource may be specified through a drop box accessible by a patron. In some embodiments, the drop box may be user specified allowing a user to select a storage location where the location in the resource (i.e. a bookmark) may be specified. Such storage locations may be storage local to the user, such as a hard drive location, on-line storage, etc. Alternatively or additionally, the drop box may be a system handled API based drop box.

The method 200 may further include determining if the resource is available by querying the publisher. In particular, when a request 114-1 is received by the centralized electronic resource system 112 for an electronic resource, the centralized electronic resource system 112 can query publisher 102 directly to determine if any of the publishers have the electronic resource available.

In some embodiments, querying may include determining real time availability. For example, publishers may sell a limited number of resources which can be checked out for a specific period of time. If other users have already checked out the total number of available resources, then this resource is not available to another user until one of the copies is checked back in. Rather than redirecting a user to the publisher website to determine if a copy is immediately available, some embodiments show real time availability in product user interfaces by querying the publisher system behind the scenes and displaying availability information in the product user interface.

In some embodiments, querying may include specifying a customer identifier and receiving availability based on customer identifier. For example, the centralized electronic resource system 112 could query publishers 102 based on a customer number associated with one of the ILSs 108, or one of the patrons 106.

In some embodiments, querying may include specifying a customer type and receiving availability based on customer type. For example, certain resources may only be available to certain types of customers and not available to others. Examples of customer types may include, but are not limited to: public libraries, private institutions, universities, non-profit organizations, individuals, etc. The centralized electronic resource system 112 could query publishers 102 and include a specification as to the customer type that might eventually be obtaining the resource. A publisher could then return results based on the specification as to the customer type.

The method 200 may further include obtaining full text of the one or more library resource with the metadata and storing the full text associated with the metadata.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a digital library environment, a method of providing electronic library resources, the method comprising:
   at a centralized electronic resource system, obtaining metadata about one or more electronic library resources from a plurality of different library resource publishers, the metadata defining locations of the electronic library resources;
   at the centralized electronic resource system, normalizing the metadata to a standardized format appropriate for a plurality of library resource systems;
   at the centralized electronic resource system, providing a user with a consistent interface to show the user content available from the plurality of different library resource publishers regardless of the publisher actually having a particular resource;
   at the centralized electronic resource system, receiving a request from the user at the consistent interface for the one or more electronic resources, wherein the request is in a format appropriate for the centralized electronic resource system, but not appropriate for the publisher having the one or more electronic library resources;
   at the centralized electronic resource system, converting the request from the user to a format and protocol appropriate for the publisher having the one or more electronic library resources;
   at the centralized electronic resource system using the converted request, obtaining the one or more electronic library resources; and
   the centralized electronic resource system providing the one or more electronic library resources to the user.

2. The method of claim 1 further comprising creating a super catalog of electronic library resources based on the normalized metadata.

3. The method of claim 2, wherein the resource systems request electronic resources against the super catalog.

4. The method of claim 1 further comprising publishing the normalized metadata to the library resource systems.

5. The method of claim 1 further comprising receiving from one or more resource systems, one or more requests for electronic library resources, wherein the requests are based on the normalized metadata.

6. The method of claim 1 further comprising retrieving the one or more electronic resources from the publisher and providing the one or more electronic resources to a patron exclusive of the publisher providing the one or more electronic resources directly to the patron.

7. The method of claim 6, wherein retrieving comprises retrieving in a plurality of versions of the one or more electronic resources.

8. The method of claim 7 wherein each of the versions of the one or more electronic resources comprises their own use restriction requirements.

9. The method of claim 7 further comprising storing the plurality of versions of the one or more electronic resources and associating the plurality of versions with a particular customer.

10. The method of claim 7 further comprising storing the plurality of versions of the one or more electronic resources and associating the plurality of versions with a particular patron.

11. The method of claim 7 further comprising storing a bookmark for each of the versions specifying a bookmarked location within the one or more electronic resources.

12. The method of claim 11, wherein the bookmarked location is specified through a drop box.

13. The method of claim 12, wherein the drop box is user specified.

14. The method of claim 12, wherein the drop box is a system handled API based drop box.

15. The method of claim 1 further comprising determining if the one or more electronic resources are available by querying one or more publishers.

16. The method of claim 15 wherein querying comprises determining real time availability of the one or more electronic resources.

17. The method of claim 15 wherein querying comprises specifying a customer identifier and receiving availability of the one or more electronic resources based on customer identifier.

18. The method of claim 15 wherein querying comprises specifying a customer type and receiving availability based on customer type.

19. The method of claim 1 further comprising obtaining full text of the one or more electronic resources with the metadata and storing the full text associated with the metadata.

20. A system for providing electronic library resources, the system comprising:
one or more processors; and
one or more computer readable media comprising computer executable instructions that when executed by the one or more processors cause the system to perform the following:
at a centralized electronic resource system, obtaining metadata about one or more electronic library resources from a plurality of different library resource publishers, the metadata defining locations of the electronic library resources;
at the centralized electronic resource system, normalizing the metadata to a standardized format appropriate for a plurality of library resource systems;
at the centralized electronic resource system, providing a user with a consistent interface to show the user content available from the plurality of different library resource publishers regardless of the publisher actually having a particular resource;
at the centralized electronic resource system, receiving a request from the user at the consistent interface for the one or more electronic resources, wherein the request is in a format appropriate for the centralized electronic resource system, but not appropriate for the publisher having the one or more electronic library resources;
at the centralized electronic resource system, converting the request from the user to a format and protocol appropriate for the publisher having the one or more electronic library resources;
at the centralized electronic resource system using the converted request, obtaining the one or more electronic library resources; and
the centralized electronic resource system providing the one or more electronic library resources to the user.

* * * * *